United States Patent
Long et al.

(10) Patent No.: US 10,799,054 B2
(45) Date of Patent: Oct. 13, 2020

(54) LOW VOLTAGE COUPLING DESIGN

(71) Applicant: Seasons 4, Inc., Toano, VA (US)

(72) Inventors: Yi Xin Long, Jiangmen (CN); Jason Loomis, Decatur, GA (US); Nash Rittmann, Odessa, FL (US)

(73) Assignee: Seasons 4, Inc., Toano, VA (US)

( * ) Notice: Subject to any disclaimer, the term of this patent is extended or adjusted under 35 U.S.C. 154(b) by 0 days.

(21) Appl. No.: 16/431,023

(22) Filed: Jun. 4, 2019

(65) Prior Publication Data
US 2019/0282016 A1    Sep. 19, 2019

Related U.S. Application Data

(63) Continuation of application No. 15/272,217, filed on Sep. 21, 2016, which is a continuation of application
(Continued)

(51) Int. Cl.
*A47G 33/06* (2006.01)
*F21V 23/06* (2006.01)
(Continued)

(52) U.S. Cl.
CPC .............. *A47G 33/06* (2013.01); *A41G 1/005* (2013.01); *A41G 1/007* (2013.01); *F21S 4/10* (2016.01); *F21V 23/045* (2013.01); *F21V 23/06* (2013.01); *F21V 33/0028* (2013.01); *H05B 45/00* (2020.01); *H05B 45/20* (2020.01);
(Continued)

(58) Field of Classification Search
CPC ........ A47G 33/06; A47G 1/005; A47G 1/007; A47G 2200/08; A47G 2033/0827; H05B 45/00; H05B 45/20; H05B 47/16; H05B 47/155; H05B 47/175; F21V 23/06; F21V 23/045; A41G 1/005; A41G 1/007;
(Continued)

(56) References Cited

U.S. PATENT DOCUMENTS 5,747,940 A * 5/1998 Openiano ............ H05B 47/155
                                                         315/185 S
6,135,283 A * 10/2000 Huang .................. B65D 25/02
                                                         206/419
(Continued)

*Primary Examiner* — Ali Alavi
(74) *Attorney, Agent, or Firm* — Craige Thompson; Thompson Patent Law

(57) ABSTRACT

Apparatus and associated methods relate to an electrical interface design architecture to independently excite each of a network of light strings and/or light string controllers with any of a number of independent excitation signals. In an illustrative example, each of the light strings may receive a selected one of the excitation signals conducted via a wiring assembly to an interface formed as a plug or a corresponding socket. In some embodiments, the interface may galvanically connect one or more of the excitation signals to a corresponding load according to user-selection of a relative orientation between the plug and the socket. In some implementations the load may include a down-stream controller that draws operating power through a selected one of the conductors at the interface. In various implementations, the interface may supply a load such as a multi-channel cable or single channel light string, for example.

28 Claims, 9 Drawing Sheets

Related U.S. Application Data

No. 14/831,625, filed on Aug. 20, 2015, now Pat. No. 9,833,098, which is a continuation-in-part of application No. 13/745,795, filed on Jan. 19, 2013, now Pat. No. 9,173,443, which is a continuation-in-part of application No. 13/288,114, filed on Nov. 3, 2011, now abandoned, which is a continuation-in-part of application No. 12/836,425, filed on Jul. 14, 2010, now Pat. No. 8,053,042, said application No. 14/831,625 is a continuation-in-part of application No. 14/576,661, filed on Dec. 19, 2014, now Pat. No. 9,739,431, and a continuation-in-part of application No. 14/796,950, filed on Jul. 10, 2015, now Pat. No. 9,674,925, which is a continuation of application No. 13/426,577, filed on Mar. 21, 2012, now Pat. No. 9,113,515.

(60) Provisional application No. 61/466,402, filed on Mar. 22, 2011.

(51) Int. Cl.
*A41G 1/00* (2006.01)
*F21V 23/04* (2006.01)
*F21S 4/10* (2016.01)
*F21V 33/00* (2006.01)
*H05B 45/00* (2020.01)
*H05B 45/20* (2020.01)
*H05B 47/16* (2020.01)
*H05B 47/155* (2020.01)
*H05B 47/175* (2020.01)
*F21Y 115/10* (2016.01)
*F21Y 103/10* (2016.01)
*F21W 121/04* (2006.01)
*A47G 33/08* (2006.01)
*F21Y 113/13* (2016.01)

(52) U.S. Cl.
CPC ........... *H05B 47/155* (2020.01); *H05B 47/16* (2020.01); *H05B 47/175* (2020.01); *A47G 2033/0827* (2013.01); *A47G 2200/08* (2013.01); *F21W 2121/04* (2013.01); *F21Y 2103/10* (2016.08); *F21Y 2113/13* (2016.08); *F21Y 2115/10* (2016.08)

(58) Field of Classification Search
CPC ..... F21S 4/10; F21Y 2115/10; F21Y 2103/10; F21Y 2113/13; F21W 2121/04
USPC ........................................................ 362/457
See application file for complete search history.

(56) References Cited

U.S. PATENT DOCUMENTS

| | | | |
|---|---|---|---|
| 6,422,891 B1* | 7/2002 | Huang | F21V 23/06 362/249.01 |
| 6,653,797 B2* | 11/2003 | Puleo, Sr. | H05B 47/155 315/185 S |
| 2002/0168894 A1* | 11/2002 | Goebel | H01R 25/00 439/574 |
| 2003/0156411 A1* | 8/2003 | Ahroni | F21V 23/04 362/249.01 |
| 2004/0075401 A1* | 4/2004 | Segan | H05B 47/155 315/291 |
| 2006/0164834 A1* | 7/2006 | Kao | A47G 33/06 362/249.01 |

* cited by examiner

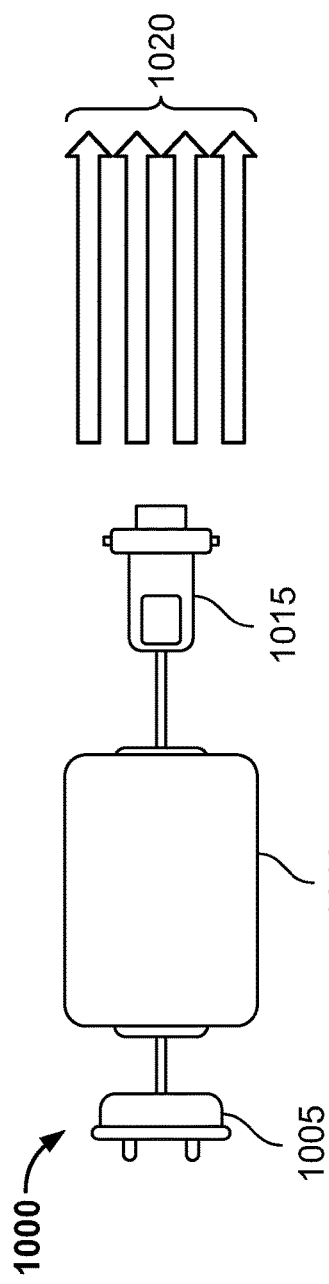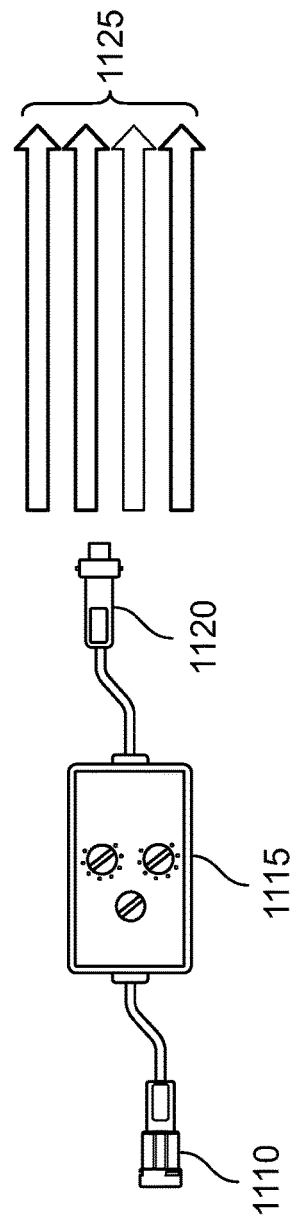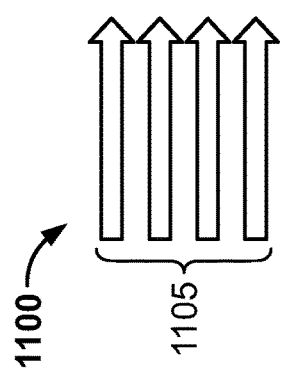

LOW VOLTAGE COUPLING DESIGN

CROSS-REFERENCE TO RELATED APPLICATIONS

The present application is a continuation of U.S. patent application Ser. No. 15/272,217 titled "Architecture for Routing Multi-Channel Commands Via a Tree Column" filed by Jason Loomis on Sep. 21, 2016 which is a continuation of U.S. patent application Ser. No. 14/831,625 titled "Architecture for Routing Multi-Channel Commands Via a Tree Column," filed by Jason Loomis on Aug. 20, 2015 which is a continuation-in-part of U.S. patent application Ser. No. 14/576,661 titled "Modular Light-String System Having Independently Addressable Lighting Elements," filed by Loomis, et al. on Dec. 19, 2014, and is also a continuation-in-part of U.S. patent application Ser. No. 14/796,950 titled "Low Voltage Coupling Design," filed by Long, et al. on Jul. 10, 2015 which is a continuation of U.S. patent application Ser. No. 13/426,577 titled "Low Voltage Coupling Design," filed by Long, et al. on Mar. 21, 2012 which claims benefit of U.S. Provisional Application Ser. No. 61/466,402 titled "Low Voltage Coupling Design," filed by Long, et al. on Mar. 22, 2011. U.S. patent application Ser. No. 14/831,625 is also a continuation-in-part of U.S. patent application Ser. No. 13/745,795 titled "Architecture for Routing Multi-Channel Commands Via a Tree Column," filed by Jason Loomis on Jan. 19, 2013 which is a continuation-in-part of U.S. patent application Ser. No. 13/288,114 titled "Artificial Tree Apparatus with Axial Electrical Connectors," filed by Jason Loomis on Nov. 3, 2011 which is a continuation-in-part of U.S. patent application Ser. No. 12/836,425 titled "Artificial Tree Apparatus," filed by Jason Loomis on Jul. 14, 2010 which claims benefit of U.S. Provisional Application Ser. No. 61/225,258 titled "Artificial Tree Apparatus," filed by Jason Loomis on Jul. 14, 2009. This application incorporates the entire contents of the foregoing application(s) herein by reference.

TECHNICAL FIELD

Various embodiments relate generally to electrical lighting systems with configurable multi-channel architectures.

BACKGROUND

Electrical energy can be generated at a generator and transported widely to supply electrical loads. As the energy is transported over great distances, the electrical energy may be in the form of a high potential voltage so that power can be delivered at correspondingly low currents to avoid resistive dissipation in the conductors. As the energy comes in proximity to the load, the voltage may be reduced to lower, safer levels. At the load, the electrical energy may be converted to some other form, such as heat, audible music, rotary motion, linear motion, or electromagnetic radiation.

Lights are one type of load that converts electrical energy to electromagnetic radiation. Visible light may result, for example, when electrical current flows through a resistive conductor causing the conductor to heat-up enough to glow. Visible light may also result when electric current arcs between terminals, as in an arc discharge lamp, or when electrons flow across a p-n junction, as in a light emitting diode (LED).

Individual light sources may be combined on a common load circuit that carries a common current so that a single current illuminates multiple light sources simultaneously. Such a load circuit may be referred to as a light string. In some applications, a light string load may include multiple load circuits connected in series and/or parallel.

SUMMARY

Apparatus and associated methods relate to an electrical interface design architecture to independently excite each of a network of light strings and/or light string controllers with any of a number of independent excitation signals. In an illustrative example, each of the light strings may receive a selected one of the excitation signals conducted via a wiring assembly to an interface formed as a plug or a corresponding socket. In some embodiments, the interface may galvanically connect one or more of the excitation signals to a corresponding load according to user-selection of a relative orientation between the plug and the socket. In some implementations the load may include a down-stream controller that draws operating power through a selected one of the conductors at the interface. In various implementations, the interface may supply a load such as a multi-channel cable or single channel light string, for example.

In some examples, a transformer may split the power supply into four channels. Through the steady power (e.g., DC voltage) channel, power may be delivered to down-stream controllers separated by a network of one or more linking wiring assemblies. Each wiring assembly may include one or more terminations. Each termination may include an electrical interface adapted to mate with any corresponding plug or socket in the network. In some examples, each interface may supply electrical excitation signals to substantially independent (e.g., electrically parallel) circuit branches.

In some examples, each channel of electrical excitation may be modulated to produce independent lighting effects on selected light string loads. The electrical excitation signals may include a substantially steady unipolar electrical excitation to power at least one downstream non-light string load and/or a light string (e.g., continuously on).

Various embodiments may achieve one or more advantages. For example, some embodiments may allow promote flexibility in design and placement of light strings operated simultaneously from independent electrical excitation signal channels. In some embodiments, the network architecture may substantially reduce the difficulty, time, expense while improving performance capabilities by supplying a network of light strings with a standardized set of wiring assemblies. The standardized interfaces with user-selectable interconnections may reduce or eliminate additional wiring to supply loads with multiple independent channels of electrical excitation. For example, an exemplary architecture may allow the excitation supplied to a light string to be selected from 1-of-N available excitation signals by the user simply unplugging the interface and adjusting the relative orientation of the plug and socket to any of N available positions. In some wiring assemblies, multiple terminations provide access to multiple channels for multiple single-channel light strings. In addition, some embodiments may be connected in series and parallel networks via standardized interfaces to distribute multiple independent channels where they are needed with a single wiring assembly. Accordingly, some embodiments may reduce cost and simplify creation of sophisticated lighting effects in different locations, such as in a retail store environment, within a water fountain display, or around various bushes or trees to decorate a yard with light strings.

The details of various embodiments are set forth in the accompanying drawings and the description below. Other features and advantages will be apparent from the description and drawings, and from the claims.

BRIEF DESCRIPTION OF THE DRAWINGS

FIGS. 10-12 depict views of exemplary transformers and controllers with associated input and output connectors.

Like reference symbols in the various drawings indicate like elements.

DETAILED DESCRIPTION OF ILLUSTRATIVE EMBODIMENTS

Figure 7:
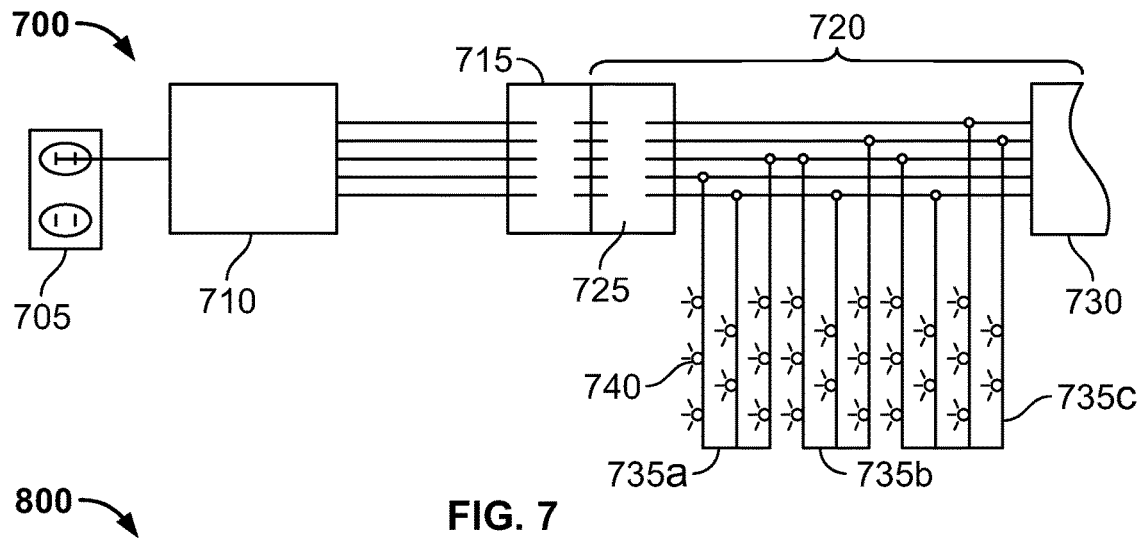
FIG. 7 depicts a schematic view of an exemplary network architecture using the interface of FIG. 1.
Figure 8:
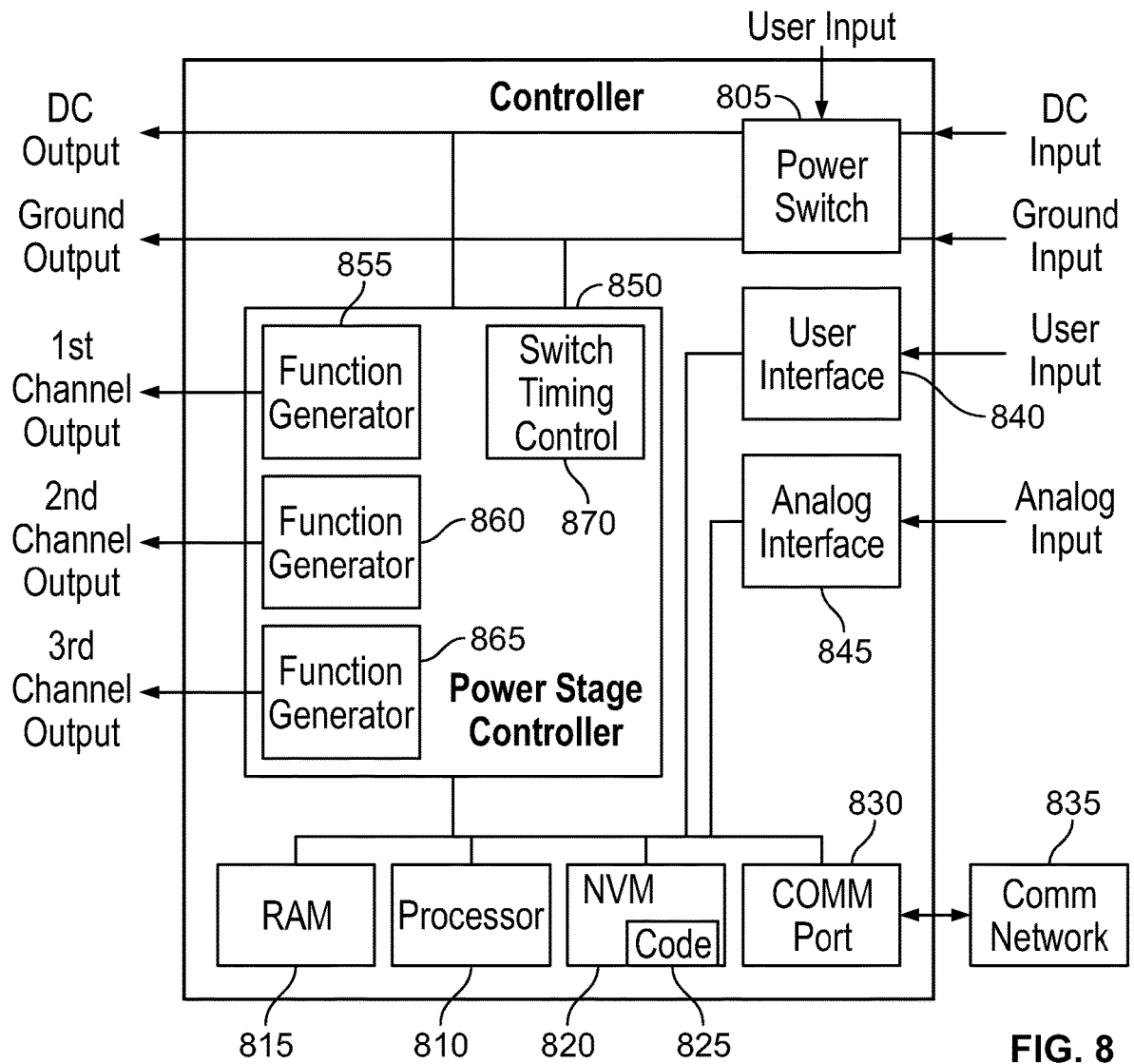
FIG. 8 depicts an exemplary controller implemented for outputting independent electrical excitation signals.
Figure 9:
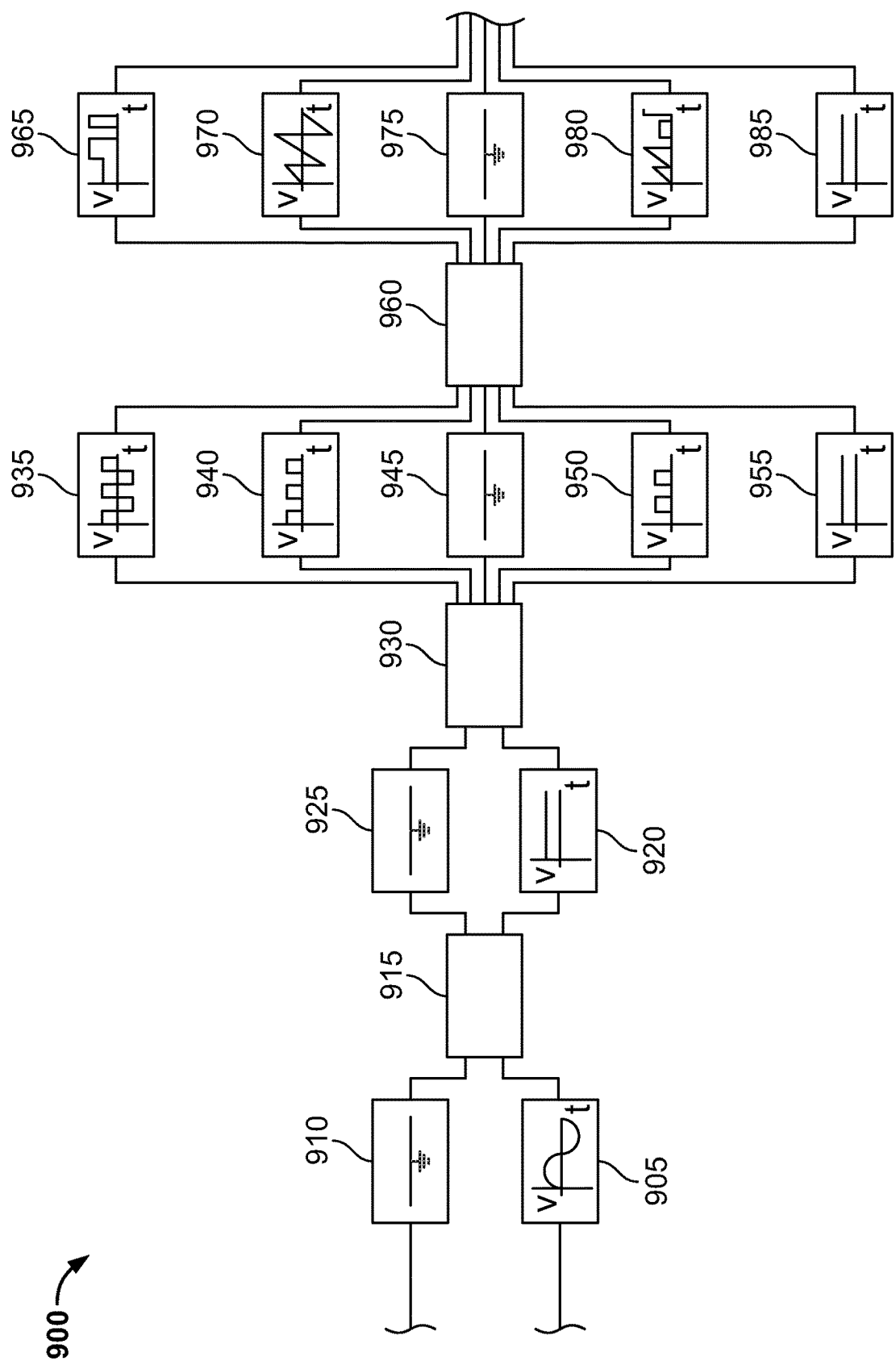
FIG. 9 depicts an exemplary multiple controller system.

To aid understanding, this document is organized as follows. First, exemplary couplings for a standardized interface are briefly introduced with reference to FIGS. 1-6. Second, FIG. 7 depicts a schematic view of an exemplary network architecture using the interface of FIG. 1, for example. Third, FIG. 8 depicts an exemplary controller implemented for outputting independent electrical excitation signals and FIG. 9 depicts an exemplary multiple controller system. Second, with reference to FIGS. 10-13, the discussion turns to components available for building a light string system enabled by the exemplary couplings of FIGS. 1-6. Finally, with reference to FIGS. 14 and 15, the discussion turns to exemplary embodiments of light string systems using the components of FIGS. 10-13.

Figure 1:
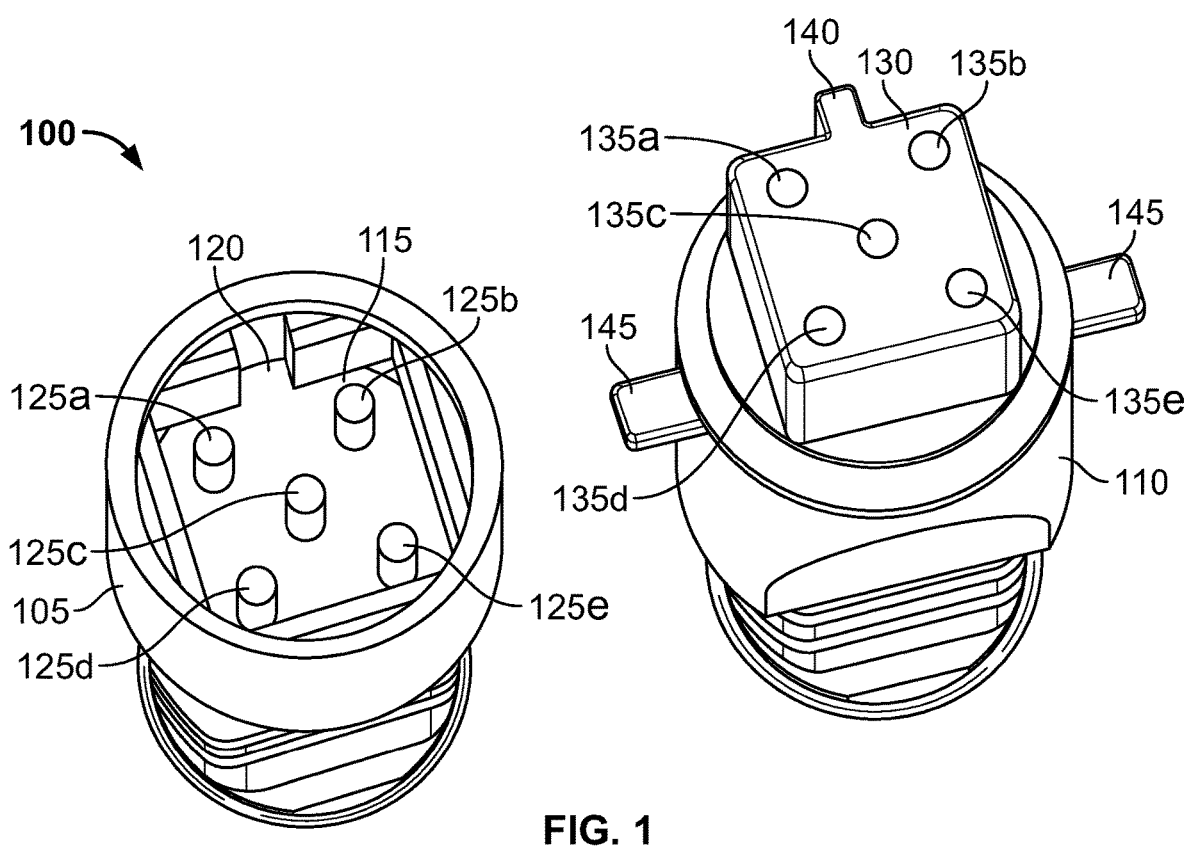
FIG. 1 depicts a perspective view of an exemplary multi-channel interface for coupling independent electrical excitation signals.

FIG. 1 depicts a perspective view of an exemplary multi-channel interface for coupling independent electrical excitation signals. Multi-channel couplings, such as three-channel couplings, may be used with multi-channel light strings, such as three-channel light strings, for example. A multi-channel coupling interface 100 includes a first connector body or plug 105 and a second connector body or socket 110 that are adapted to cooperate. In various examples, the plug 105 may be connected to the light strings or other downstream loads and the socket 110 may be connected to an upstream excitation source. In some implementations, the upstream excitation source may include a power circuit (not shown) through intervening controller (not shown) and bus line (not shown). Electricity is input from the power circuit into the controller and output through the bus line to the light strings.

The plug 105 includes a plug connecting face 115 with plug contacts or channels 125A-E. The plug connecting face 115 is shown as a depression in the shape of a rectangle with rounded corners concentric within a circular frame. The plug connecting face 115 includes an orienting notch 120 connected to the depression. The plug channels 115 are positioned within the depression. In some embodiments, the depression may be circular. In some embodiments, the frame may be rectangular.

The socket 110 includes a socket connecting face 130 with socket contacts or channels 135A-E. The socket connecting face 130 is shown as a protrusion in the shape of a rectangle with rounded corners positioned on a cylindrical support. The plug connecting face 130 includes a projection 140 connected to the protrusion. In some embodiments, the protrusion may be in the shape of a circle. In some embodiments, the support may be in the shape of a rectangular prism.

The socket 110 may also include tabs 145 extending laterally outward from the sides of the body to receive and hold a retaining cover as will be described in reference to FIGS. 3-6.

The notch 120 and projection 140 form a mating interface for mating together to ensure that the first connector body or plug 105 and second connector body or socket 110 connect in a predetermined and certain orientation such that specific plug contacts or channels 125A-E align with certain respective socket contacts or channels 135A-E.

The plug channels 125A, B, E and the socket channels 135A, B, E are channels for supplying independent electrical excitation signals to create different lighting effects at loads to be connected by the user. In some implementations, these channels can operate independently of each other. In some examples, for example in applications with high load current loads, the same electrical excitation source may be supplied to two or more of the channels, and the loads may be substantially balanced among the parallel paths by appropriate user selection of the relative orientations between each plug and socket. The plug channel 125D and the socket channel 135D form the steady power channel at which steady power may be accessed by light strings anywhere downstream from the controller.

In the depicted example, the plug channel 125C and the socket channel 135C form a common channel for forming a return path for each of the independent channels. In other embodiments, one or more common return paths may provide a separate return for two or more of the electrical excitation signal paths. In various embodiments, the at least one common channel may be arranged to be substantially oriented along or around an axis of symmetry for the interface. In the depicted example, the socket channel 135C lies substantially along a central axis that is orthogonal to a plane defined between the plug and socket when engaged. In any relative orientation allowed in FIG. 1 or FIG. 3, as will be described, the corresponding common terminal(s) of the plug 105 and the socket 110 will properly register.

When the plug 105 is connected with the socket 110, the plug connecting face 115 cooperates with the socket connecting face 130. The notch 120 cooperates with the projection 140 to permit only a single valid registration. When the connecting faces 115, 130 cooperate, the plug channels 125A-E connect with the corresponding socket channels 135A-E.

Figure 2:
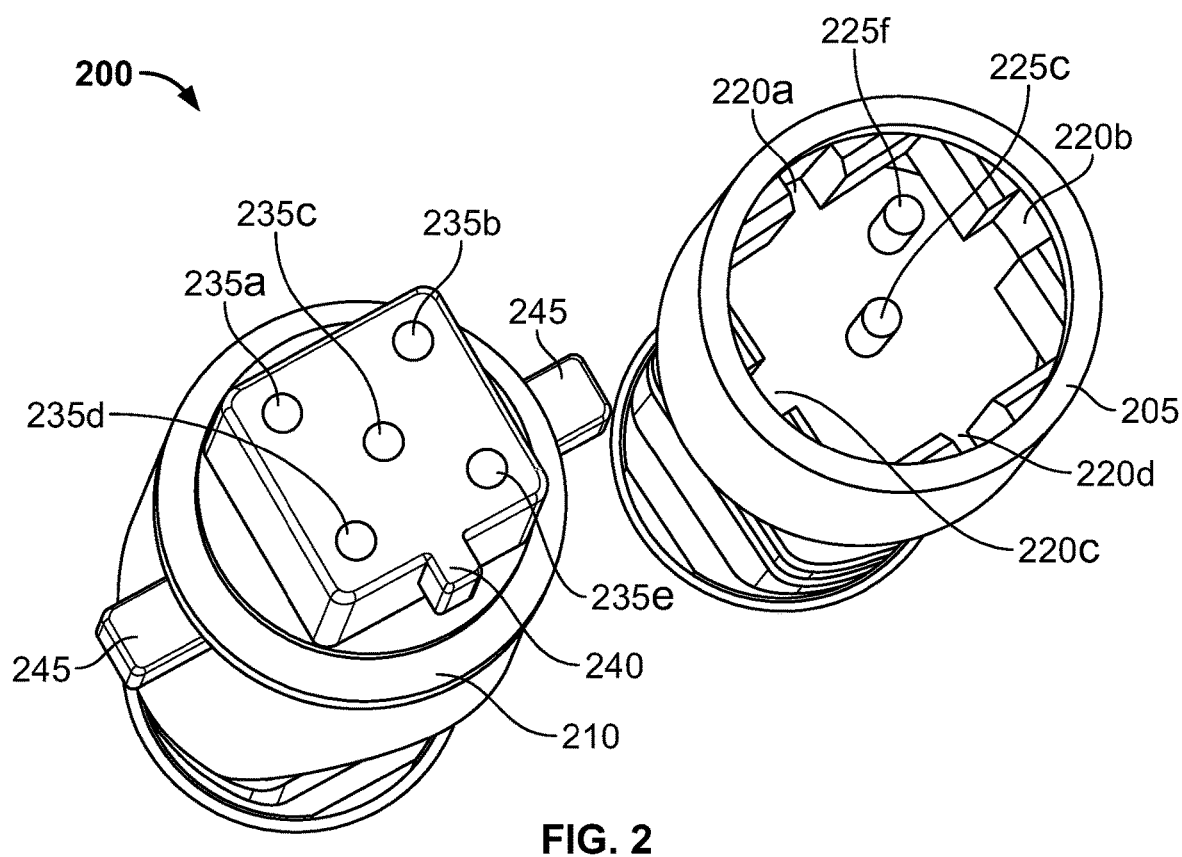
FIG. 2 depicts a perspective view of an exemplary single channel interface for coupling any of the available independent electrical excitation signals based on a relative orientation of the plug and socket.

FIG. 2 depicts a perspective view of an exemplary single channel interface for coupling any of the available independent electrical excitation signals based on a relative orientation of the plug and socket. A single channel coupling can be used with a single channel load, such as a light string or downstream controller module, for example. A single channel coupling 200 includes a socket 205 and a plug 210. The plug 210, which includes socket channels 235A-E and projection 240, has a similar configuration to that in FIG. 1. The socket 205 includes socket channels 225C, F and notches 220A-D. When socket 205 and plug 210 are connected, the projection 240 may cooperate with any of the notches 220A-D. While socket channel 220C is connected with plug channel 235C, a user may select which plug channel 235A, B, D, E connects with socket channel 225F by positioning the projection 240 to cooperate with notches 220A, B, C, D. In some embodiments, the plug 210 is rotated relative to the socket 205 until the projection 240 cooperates with desired notch 220A, B, C, or D.

The projection 240 may correspond to a mating structure on the socket 210 and the notches 220A-D may correspond to first, second, third, and fourth mating structures on the plug 205. Depending on the mating interface that is utilized between the projection 240 and notches 220A-D the channel 235A, B, D, E output may differ. In some examples, the channels 235A, B, D, and E may each be electrically isolated to output a different or specific generated waveform predetermined for that specific channel 235A, B, D, E. In another example, one of the channels 235A, B, D, E may correspond to an on position and one of the channels 235A, B, D, E may correspond to an off position. By way of example, and not limitation, the plug may have 2, 3, 5, 6, 7, or 8 notches, and a corresponding number of independent channels. In another example, the plug 205 may have 3, 4, 5, or more channels to correspond with a similar number and orientation of channels of the socket 210.

The socket 210 may also include tabs 245 extending laterally outward from the sides of the body to receive and hold a retaining cover as will be described in reference to FIGS. 3-6.

FIGS. 3-6 depicts a perspective view of an exemplary assemblage and locking structure for a single or multi-channel interface.

Figure 3:
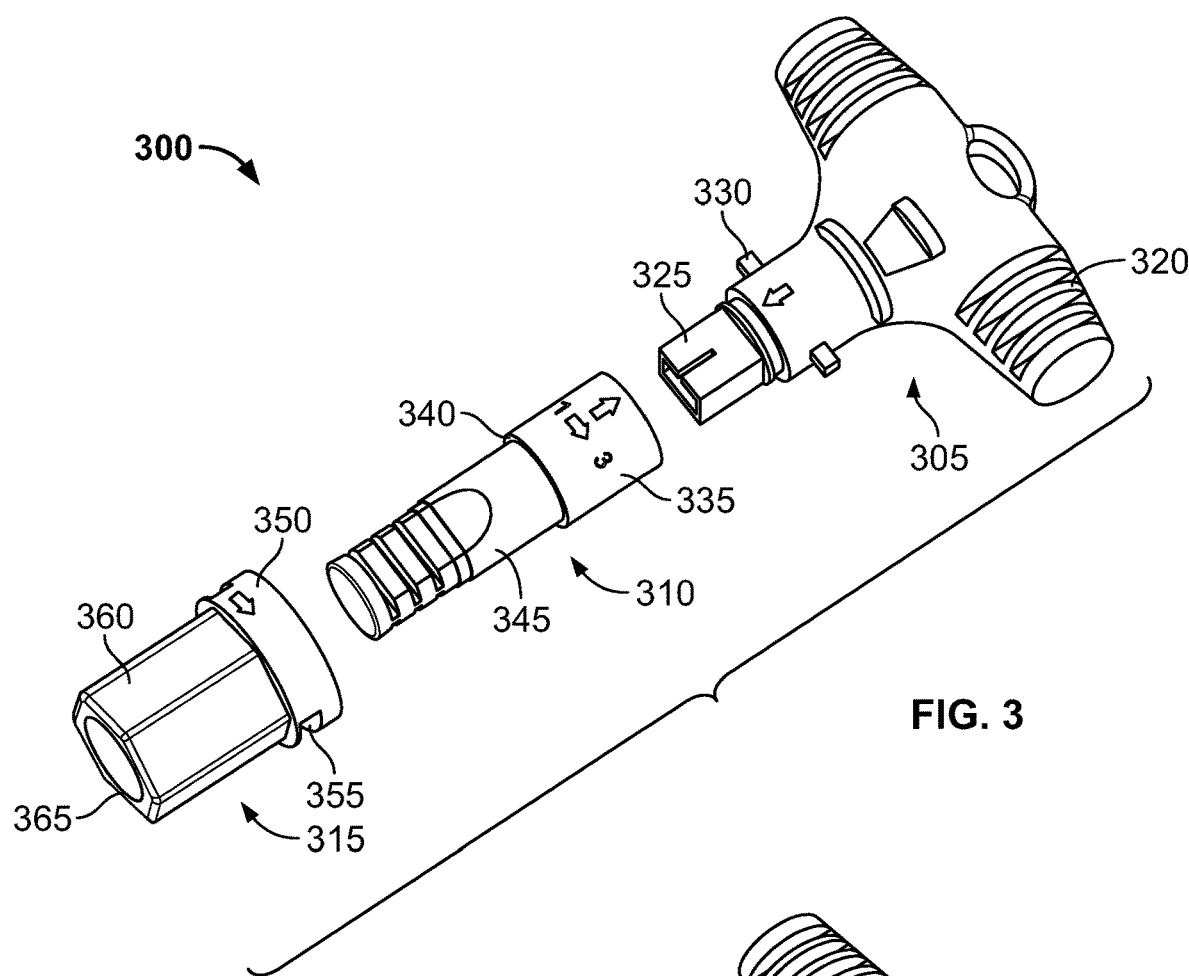
FIGS. 3-6 depicts a perspective view of an exemplary assemblage and locking structure for a single or multi-channel interface.

FIG. 3 shows an exploded view of an exemplary assembly 300. The assembly 300 includes a first connector 305, a second connector 310, and a retaining cover 315 that can be coupled to form a multi or single channel interface for one or more excitation signals. In various embodiments, the signals may be coupled together, for example, in a predetermined manner as described in reference to FIG. 1, or relative to an orientation of the coupled first connector 305 and second connector 310 as described in reference to FIG. 2.

The first connector 305 includes a junction 320, a socket 325 having a plurality of channels, and outer tabs 330. As shown in the exemplary first connector 305, the junction 320 comprises a T-shape. The second connector 310 comprises a plug 335 having a plurality of channels for mating with one or more of the channels of the socket 325. Also shown in connection with the second connector 310 is a ridge 340 forming the base of the plug 335 and an extended portion 345 extending from the base 340 opposite the plug 335.

The retaining cover 315 has a first portion 350 at a forward end comprising a ring shape and having one or more retaining slots 355 to correspondingly mate with and lock upon the tabs 330 of the first connector 305. Also included with the retaining cover 315 is a second portion 360 extending rearwardly of the first portion 350 and forming an elongated ring shape having an opening 365 extending through concentric with the first portion 350 and for receiving the extended portion 345 of the second connector 310 and being retained thereupon.

Figure 4:
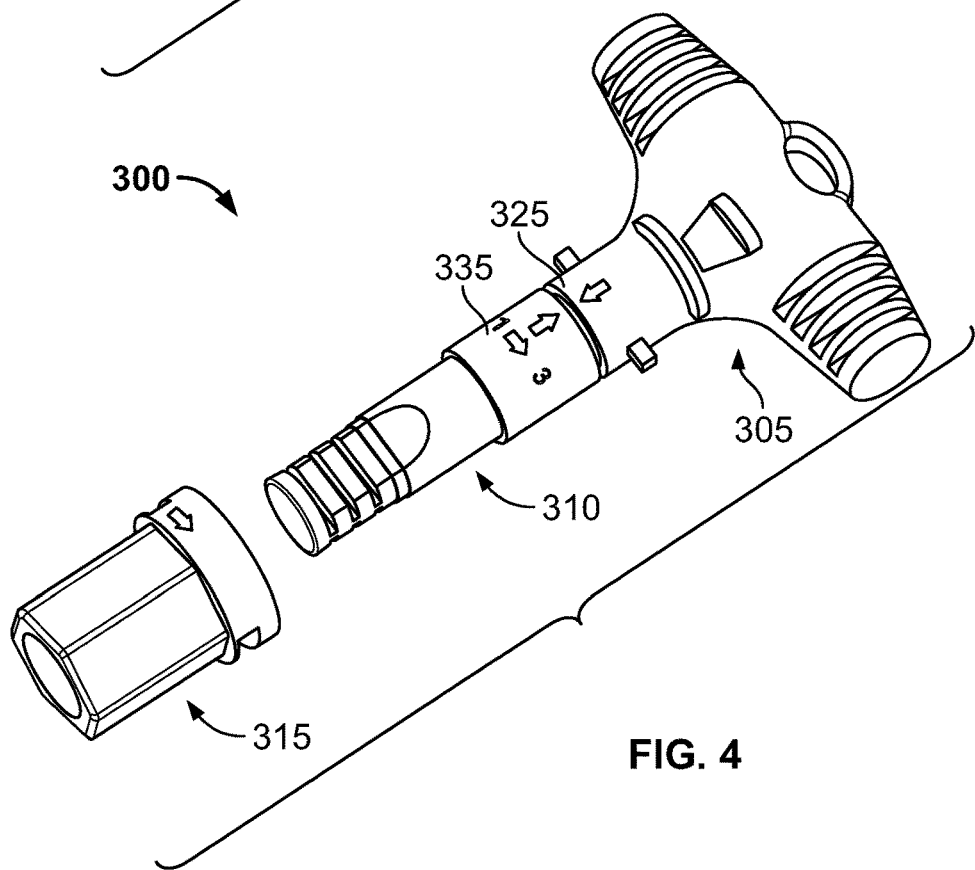

FIG. 4 shows the assembly 300 of FIG. 3 in a next exemplary step of coupling, with the second connector 310 coupled to the first connector 305. The socket 335 is connected to the plug 325 such that corresponding channels of the socket and plug are connected (e.g., galvanically coupled, in fluid communication, in direct contact). In some embodiments, one or more of the corresponding channels may serve to conduct energy in the form of a generated electrical waveform. In some examples, one or more of the corresponding channels may serve to transfer a fluid therethrough such as, for example, water, a fluid, or a pressurized gas.

Figure 5:
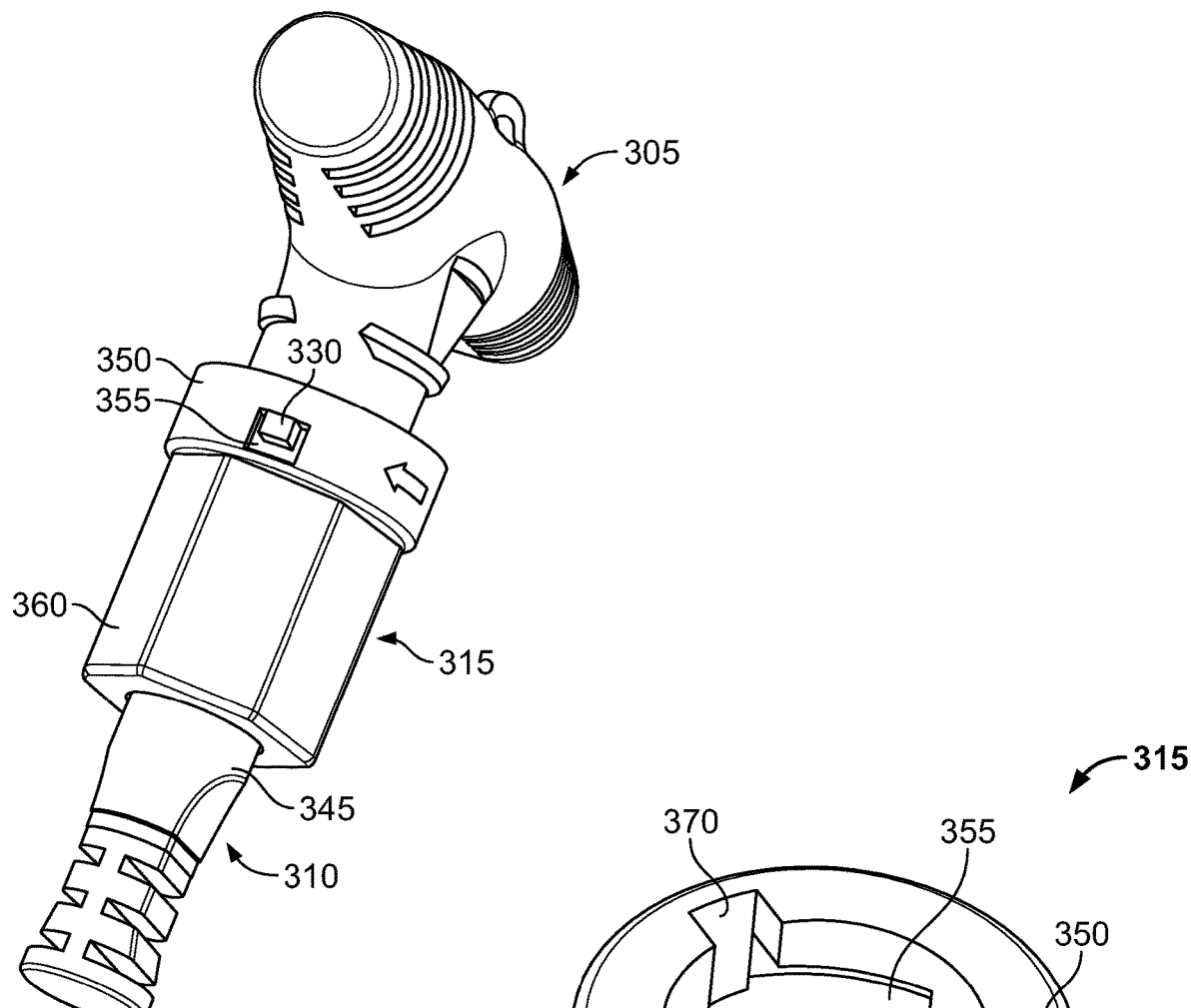

FIG. 5 shows the assembly 300 of FIG. 3 in a next exemplary step of coupling after that described with reference to FIG. 4. In this example, the retaining cover 315 is extended over the second connector 310 such that the second portion 360 receives the extended portion 345 and is extended forwardly against the ridge 340 such as to engage the ridge 340 to stop forward movement of the retaining cover 315. Also illustrated is the tab 330 locked within the retaining slots 355. The retaining slot 355 is shown as having a tapering shape. In some examples the tab 330 may be received within the wider portion of the slot 355 and moved via rotation of the retaining cover 315 to within the narrower portion of the slot 355. In some examples, the retaining cover 315 may be locked upon the first and second connectors 305, 310 via an insert and twist-lock manner.

Figure 6:
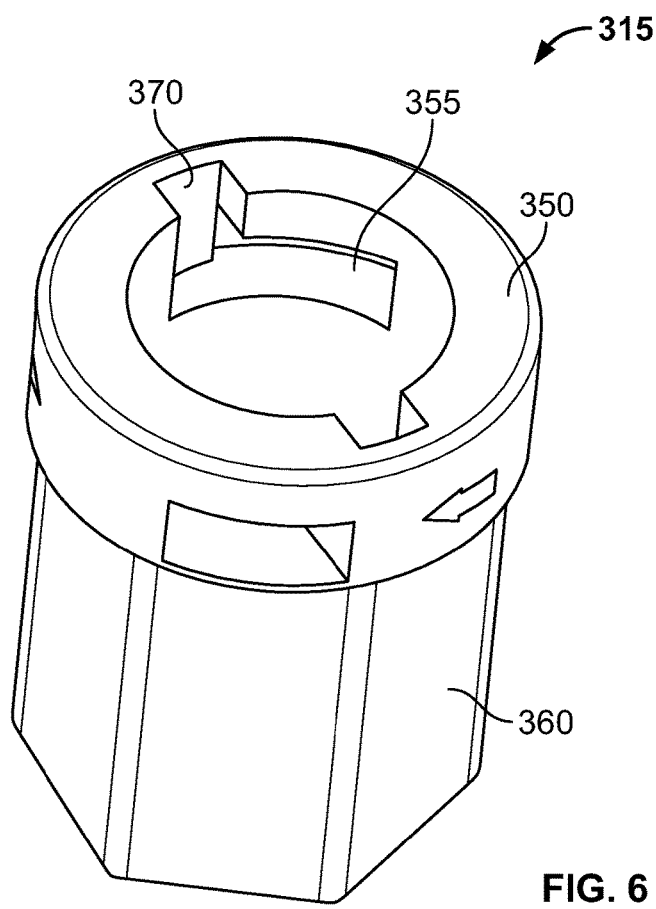

FIG. 6 illustrates an upper perspective view of the retaining cover 315 described with reference to FIGS. 3-5. The retaining cover 315 includes receiving slots 370 along an outer face to receive the tabs 330 subsequent to the tabs 330 being locked and retained within the retaining slots 355, wherein the receiving slots 370 are in connection with a corresponding retaining slots 355 to provide for a smooth transition of the tabs 330 from the receiving slots 370 to the retaining slots 355.

FIG. 7 depicts a schematic view of an exemplary network architecture using the interface of FIG. 1. A light string system 700 accepts electrical power from a power outlet 705, transformer 710. The transformer 710 conditions the power, for example to low voltage for safety against shock, and delivers the conditioned power to a transformer socket 715 and a coupling 720. The coupling 720 includes a coupling plug 725 and a coupling socket 730. Light strings 735A-C are connected to the coupling 720 via the coupling plug 725. Light strings 735A-C include sub-light strings 740. Electrical excitation signals may be input from the power outlet 705 into the transformer 710 and out of the coupling 720 and into the light strings 735A-C. The transformer 710 splits the power supply into four separate channels as shown by the coupling 720 with five channels, one of which is the common channel at which different light strings may be connected.

As depicted in FIG. 7, the light strings 735A-C are connected in parallel to one or more of the channels received at the plug 725. Each of the light strings 735A-C has one end connected to the common channel and an opposite end connected to one of the other channels. Light strings 735A and 735B each include 3 sub-light strings. Light string 735C each include 4 sub-light strings. A controller using three channels may be used to create different lighting effects from each of the light strings. In some embodiments, the light strings can be controlled to flash at different frequencies, for example.

FIG. 8 depicts an exemplary controller 800 implemented for outputting independent electrical excitation signals. The controller 800 includes a DC input and a ground input that may lead to a power switch 805 controlled by user input. In some embodiments an upstream controller 800 may control operation of the power switch 805. Output from the controller 800 is a DC output and a ground output. The output DC voltage may be the same as the input DC voltage such that the DC passes-through the controller 800 without being changed. In some embodiments, the power switch 805 may be omitted.

The controller 800 also includes a processor 810 (e.g., CPU), random access memory (RAM) 815, non-volatile memory (NVM) 820 having which may have embedded code 825, and a communications port 830. The processor 810 may execute code 825 to perform various digital or analog control functions. The processor 810 may be a general purpose digital microprocessor 810 which controls the operation of the controller 800. The processor 810 may be a single-chip processor 810 or implemented with multiple components. Using instructions retrieved from memory, the processor 810 may control reception and manipulations of input data and the output data or excitation signals. RAM may be used by the processor 810 as a general storage area and as scratch-pad memory, and can also be used to store input data and processed data.

The exemplary controller 800 also includes a user interface 840 controlled by user input and an analog interface 845 controlled by analog input. The user interface 840 may include dials, such as for example timing dials, frequency dials, or amplitude control dials. The user interface 840 may include switches or control buttons, such as for example amplitude changing controls, channel changing controls, or frequency changing controls. The user interface 840 and the analog interface 845, as well as the processor 810, memory, and communications are connected to a control module 850.

A communications network 835 may communicate with the communications port 830 and may be utilized to send and receive data over a network 835 connected to other controllers 800 or computer systems. An interface card or similar device and appropriate software may be implemented by the processor 810 to connect the controller 800 to an existing network 835 and transfer data according to standard protocols. The communications network 835 may also communicate with upstream or downstream controllers 800, such as for example to activate or deactivate upstream or downstream controllers 800. In some embodiments, the communications network 835 is suited for routing a master-slave command to downstream controller 800. In the embodiment, the controllers 800 include suitable circuitry for interpreting the master-slave command. Commands sent to upstream or downstream controllers 800 may be sent through power line carrier modes, optical (e.g., infrared, visible), sound (e.g., audible, ultrasonic, subsonic modulation), or wireless (e.g., Bluetooth, Zigbee) modes, for example.

The exemplary control module 850 includes a plurality of function generators 855, 860, 865 each for outputting one or more predetermined or user-configured waveforms to a corresponding channel. The function generators 855, 860, 865 may operate independently of one another or together. The function generators 855, 860, 865 may receive pre-stored data for outputting predetermined waveforms or may receive user-configured data from user input to generate unique and customizable waveforms. In some embodiments, the waveforms generated may be electrical waveforms which control and regulate output lumens from one or more lights upon a light string. In some examples, the control module 850 may also include a switch timing control 870 which may use a duty cycle to generate control signals for use by the function generators 855, 860, 865. In some embodiments, the control signals may be timed to draw specific current waveforms at specific intervals.

In some embodiments, the waveforms generated by the function generators 855, 860, 865 may comprise one or more frequencies. In some embodiments, the waveforms generated may cause a blinking effect among the connected lights. In some embodiments, the waveforms generated may cause a steady-on effect among the connected lights. In some embodiments, the waveforms generated may cause a dimming effect among the connected lights. In some embodiments, the waveforms generated may cause a dimming effect followed by a steady-on effect among the connected lights. In some embodiments, the waveforms generated may cause a blinking effect followed by a dimming effect followed by a steady-on effect among the connected lights.

FIG. 9 depicts an exemplary multiple controller system. In a multiple controller system 900 as depicted in FIG. 9, each signal voltage vs. time waveform is shown in graphical format at the various stages in the system 900. In a first stage, a sinusoidal AC input 905 and common or ground 910 are shown coupled to a transformer for conditioning the signal and converting the AC signal to a DC format. In some embodiments, other half-wave or full-wave rectifiers may be used for conversion of the AC signal into a DC signal. In some embodiments, the AC signal is converted into a DC (e.g., substantially unipolar) signal with amplitude of, for example, about 9, 12, 15, 18, 21, 24, 27, 30, 34, 38, 42, or up to at least about 60 volts. In some examples, the DC signal may be considered to be safety extra low voltage (SELV) or otherwise provide substantial protection against hazardous electrical shock.

In the second stage, the DC power 920 and ground 925 are shown leading to a first controller 930. In some applications, the controller 930 may include various features of the controller 800 described with reference to FIG. 8.

In the third stage, a DC power 955 and a ground 945 continue such that the DC power and ground are passed-through the first controller 930 so that the DC voltage output from the controller 930 may be substantially the same as the DC voltage input to the first controller 930. A plurality of waveforms are generated by the controller 930 and output to a first channel 935, a second channel 940, and a third channel 950. In the exemplary first channel waveform 935 is output that generates a color-flipping sequence by two or more lights (e.g., anti-parallel diode circuits), such that a first color light and a second color light are alternately activated upon a single channel light string in response to corresponding alternate polarities of current through the light string. In the exemplary second channel 940, an on/off waveform is generated such as to cause a blinking effect among the lights. In the exemplary third channel 950, an on/off waveform is generated such as to cause a blinking effect among the lights. The waveform of the third channel 950 is depicted as delayed with respect to the waveform of the second channel 940 such that the signals of the two channels are 180 degrees out of phase (e.g., when the third channel is in an on state the second channel may be in an off state). Depending on the duty cycles, in this example, the on-times between the channels 940, 950 may overlap, or there may be dark periods when both of the channels 940, 950 are off.

In the fourth stage, a DC power 985 and a ground 975 continue such that the DC power and ground are passed-through a second controller 960 so that the DC voltage output from the controller 960 is substantially the same as the DC voltage input to the controller 960. A plurality of waveforms are generated by the controller 960 and output to a first channel 965, a second channel 970, and a third channel 975. In the exemplary first channel 965 a waveform is output that generates a first amplitude or corresponding light brightness, followed by a second amplitude or corresponding light brightness, followed by an off state, and then followed by an on state. In the exemplary second channel 970 a waveform is output that generates a dimming as well as a color-flipping pattern. In the exemplary third channel 975 a waveform is output that generates a dimming effect as well as an on/off effect.

In some embodiments, the controller 800, for example, may include an attenuator or gain circuit capable of supplying any of a plurality of values in a range between a maximum voltage and the common, or a maximum voltage line-to-line among any two of the channels, of either positive or negative polarity. For example, a wide range of analog output voltages or controlled current sources may be formed by various circuit subsystems, including without limitation, one or more of a boost, Cuk, SEPIC, Flyback, forward, buck, buck-boost converter, or an amplifier (e.g., class A, B, C, D), or equivalents thereto, taken alone or in combination, and regulated with an open-loop or closed-loop controller (e.g., voltage mode and/or current mode).

FIGS. 10-12 depict views of exemplary transformers and controllers with associated input and output connectors. FIG. 10 depicts a system 1000 having an AC plug 1005, a transformer 1010 for conditioning the input power and converting to a DC signal, and an output connector 1015. The output connector 1015 outputs a plurality of channels of DC voltage 1020. In the exemplary Figure, the connector 1015 outputs 4 channels of DC voltage. The DC voltage may be advantageously split into multiple parallel channels to reduce voltage drop in the line.

FIG. 11 depicts a system 1100 for receiving a plurality of channels of DC power 1105 via a connector 1110, and then to a three-channel ten-function controller 1115. In some embodiments, the connector 1110 may connect to a connector downstream of a transformer, such as the transformer 1010. On its output, the controller 1115 supplies three channels to create different lighting effects with each channel operating independently of the other two. The controller 1115 routes the 4 channels of DC input power received via the connector 1110 to a single output DC channel, for example, as a pass-through.

The controller 1115 may have various types and configurations of circuitry to generate or perform various functions. Some exemplary functions include steady on, single bulb chase and two bulb chase. The controller 1115 may also include fading functions to fade lights to a lower lumen output where functions may include single bulb fade or two bulb fade. The controller 1115 may also include functions for causing lights to flash, twinkle, sequential fade in fade out, all fade, and fade to dim. In addition, the controller 1115 may have speed settings to control a rate that the excitation signal amplitude lowers and corresponding lights dim. As shown in FIG. 11, the DC power and 3 waveform channels are output through another connector 1120.

All connectors may comprise easy, modular, quick connect-disconnect connectors. Some implementations may include connectors having waterproof construction (e.g., IP-65 rating or the like) that are capable of submerged operation.

FIG. 12 depicts an example of an exemplary three-channel, eight-function controller. As depicted, a controller 1130 uses three channels to create different lighting effects with each channel operating independently of the other two. The controller 1130 may include circuitry to perform similar or dissimilar functions as that described in reference to FIG. 11. In addition, user input controls may differ or be similar among different types of controllers as illustrated in FIGS. 11 and 12. In FIG. 12, some functions for lighting effects may include steady-on, combination, in waves, sequential, slo-glo, chasing/flashing, slowfade, and twinkle/flash. More or less channels may be output and/or activated via the controllers than that illustrated.

Figure 13:
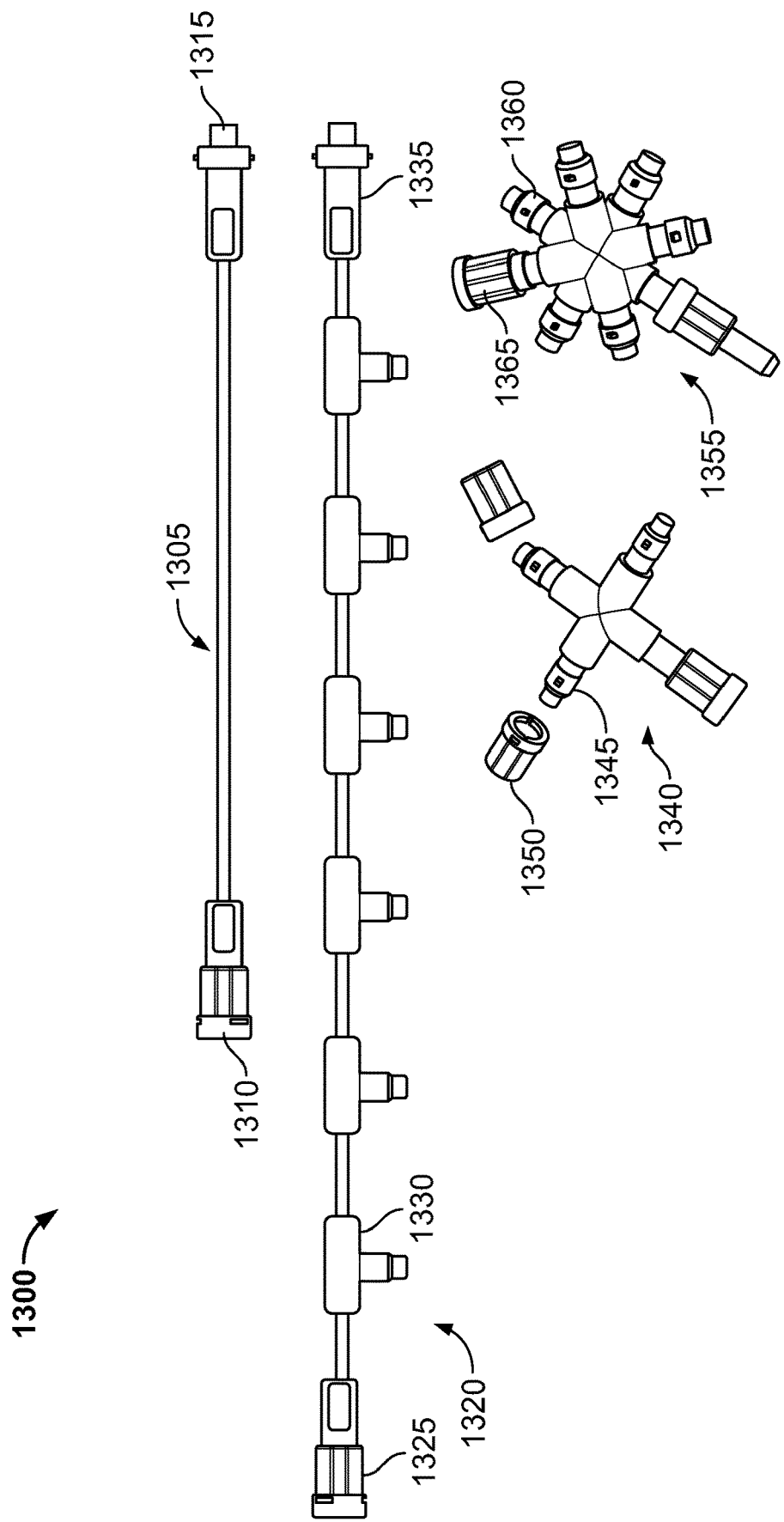
FIG. 13 depicts views of exemplary components for implementing a light string system.

FIG. 13 depicts views of exemplary components for implementing a light string system. The components 1300 include a coupling extension cord 1305 with a plug 1310 at one end and a socket 1315 at the other end. A mother or bus line 1320 includes a plug 1325 at one end, a socket 1335 at one other end, and several T-taps 1330 with socket ends in between.

Various exemplary splitters incorporating couplings are also illustrated. A first splitter 1340 includes a four-way splitter with four sockets 1345 and four plugs 1350. A second splitter 1355 includes an eight-way splitter with eight sockets 1360 and eight plugs 1365 is illustrated.

Figure 14:
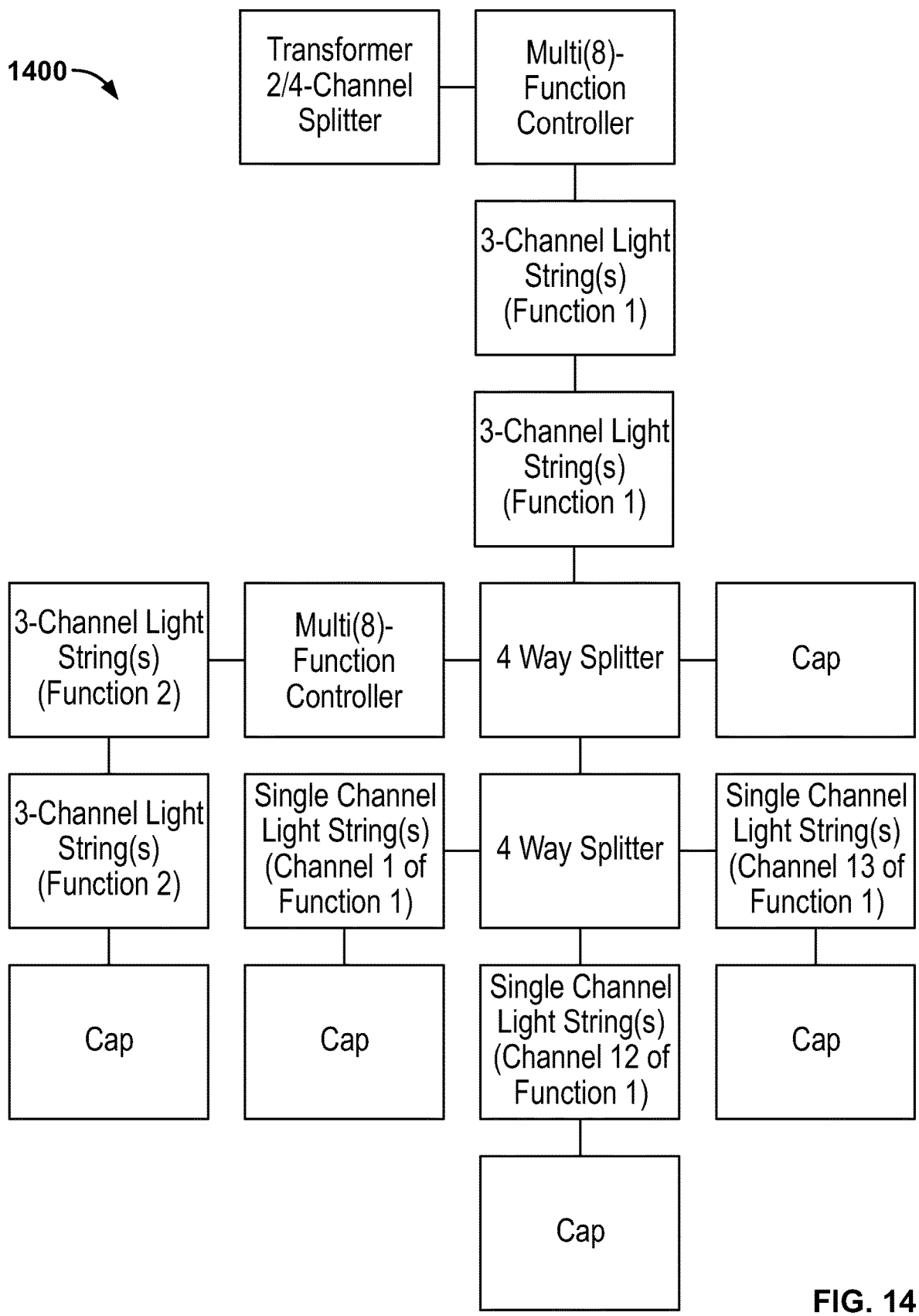
FIG. 14 depicts a block diagram of an exemplary arrangement of the components of FIGS. 10-13 in a light string system.

FIG. 14 depicts a block diagram 1400 of an exemplary arrangement of the components of FIGS. 10-13 in a light string system.

Figure 15:
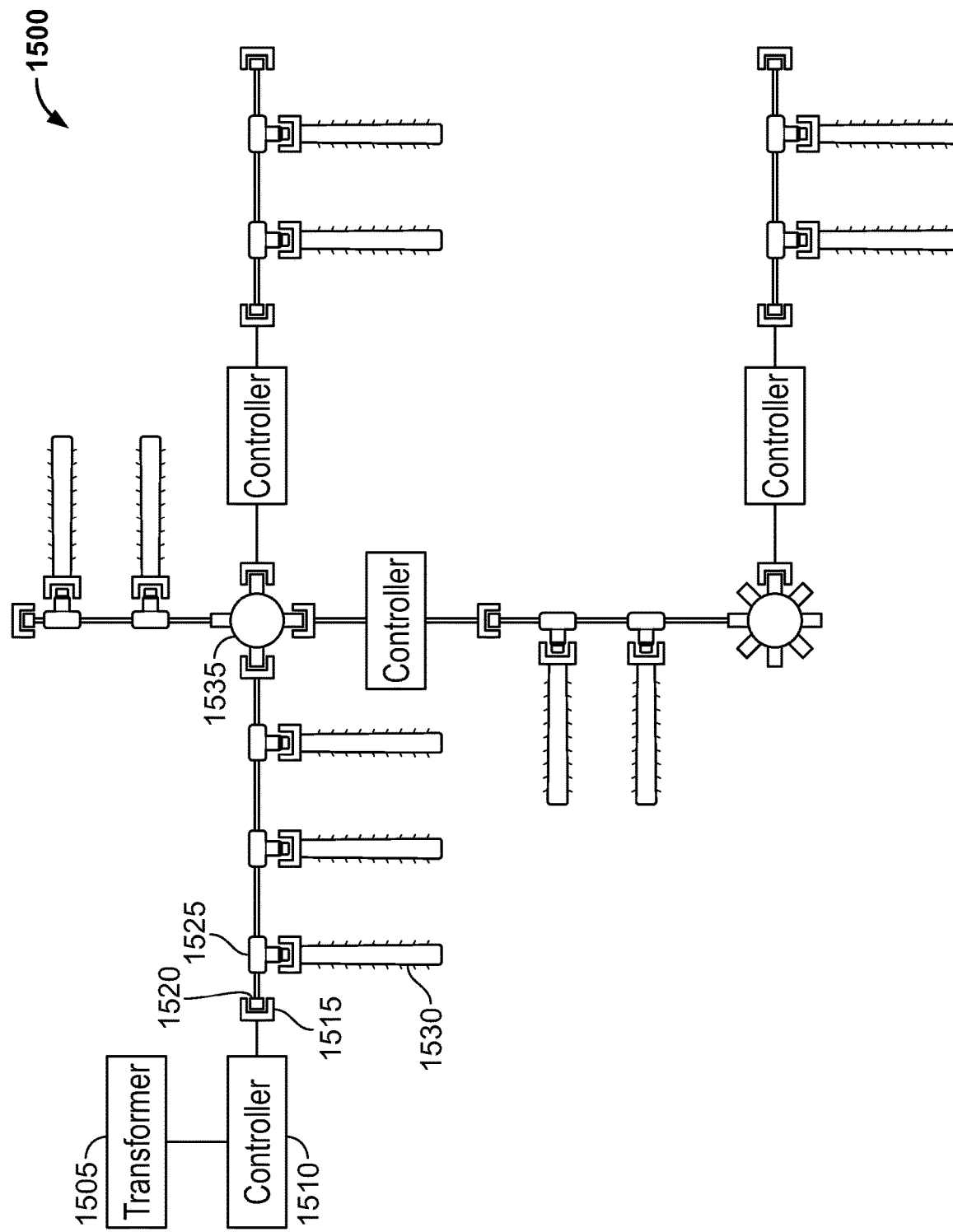
FIG. 15 depicts a schematic representation of another exemplary arrangement of the components of FIGS. 10-13 in a light string system.

FIG. 15 depicts a schematic representation of another exemplary arrangement of the components of FIGS. 10-13 in a light string system. As depicted, a system 1500 may include a transformer 1505, a controller 1510, a plug 1515 and socket 1520 coupling, as well as multiple T-taps 1525 for connecting to light strings 1530, and splitters 1535 for sectionalizing light strings and controllers. The user may create different light string systems with light strings working off different controllers either in a multi-channel or single channel effect. The transformer can be used to power light string loads and/or downstream controllers. End caps may be included to at a terminal end of a network branch to provide, for example, a protective covering for electrical safety.

Although various embodiments have been described with reference to the Figures, other embodiments are contemplated. For example, a low voltage transformer may split the power supply into 4 separate channels. Some coupling designs may include five nodes, each of which may be connected by a connector holes/pin pairs. One of the nodes is for electrical common (e.g., return path) and 4 of the nodes are for independently driven separate channels.

Some embodiments may include multiple common or return conductors. The conductors may be symmetrically arranged to permit coupling in any permitted relative orientation between socket and plug, examples of which are described with reference to at least FIG. 2, for example.

In an illustrative example, one channel may be designated as Steady Power, where one can access steady power anywhere downstream in the network configuration, even if one or more so-called Function Controllers were implemented upstream in the network.

An exemplary function of some embodiments of the described Low Voltage Coupling system may be to employ "Function Controller(s)" to create a lighting effect. The Function Controller may use, for example, 3 Channels (1-3) to create different lighting effects; each channel operating independently to the other two. In some embodiments, a downstream channel may carry a similar electrical waveform as an upstream channel. In other embodiments, a downstream channel may carry a different electrical waveform than an upstream channel.

When using 3-channel Light Strings/Products (e.g., each light string/product actually has three separate light strings in-line, each on a separate channel) there may be only one possible orientation for connecting the male and female couplers (e.g., see Multi-Channel Configuration described with reference to FIG. 1). In other embodiments, there may be multiple orientations for connecting a male and female connector, such as for example in a 90 degree orientation, 180 degree orientation, and a 270 degree orientation relative one another (e.g., see description with reference to FIG. 2).

When using single-channel light strings, the coupler design (see, e.g., single-channel dial-in configuration) may advantageously allow the user to choose which channel he/she wants to connect to; one of the function controlled channels or the steady-power channel. The user may put together multiple lighting arrays, each potentially working off a different controller, and each working in either multi-channel or single channel effect.

In some embodiments, the lighting units may include circuitry to output a first and a second color in simultaneous or an alternating manner. For example, a first light may output a first color and a second light may output a second color. The first light and the second light may be connected to the same channel or may be connected to different channels. In one embodiment, the first light corresponds to a first diode arranged in a first direction and a second light corresponds to a second diode arranged in a second direction on the same channel as the first diode to result in the color flipping output pattern. In some embodiments, the diodes may be arranged in a parallel orientation and connected along the same channel.

In some embodiments, multiple controllers may have circuitry to function in a master-slave configuration. For example, a first controller may function as a master controller and a second controller may function as a slave controller. In some embodiments, the master controller may send signals to the slave controller through the steady-state DC power line to dictate the generated waveforms by the function generator of the second controller. For example, a user may configure a first controller which in turn may configure multiple downstream controllers. In some embodiments, a singular master controller may control 2, 3, 4, 5, or 6 downstream slave controllers. In other embodiments, multiple master controllers may be used to control their corresponding slave controllers. Control signals may be sent between master and slave controllers, such as for example by a power line carrier method. In other embodiments, wireless transmission may be used to send and receive control signals and commands.

In some examples, the controller may have circuitry and/or embedded or user-configured code to control the speed at which connected lights dim, blink on and off. In some embodiments, timing features of the controller circuitry may provide for chasing displays of the lights where the lights are activated sequential to create the chasing effect. In some embodiments, the controller may include inputs for receiving audible commands, such that the function generator outputs frequencies and waveforms corresponding to an input audible command, such as for example a song or a voice. In some embodiments, the controller may include tactile inputs such that the function generator outputs waveforms corresponding to a touch or motion of the controller. For example, the light strings may activate when the controller is touched and deactivate when the controller is touched again. In some embodiments, code or commands may be loaded onto the controller via a USB or wireless device for waveform output.

In some embodiments the controller may be supplied with a high DC power suitable for outputting a plurality of steady-on channels. In other embodiments, the controller may be supplied with a lower DC power that would not be suitable for outputting steady power channels in some or all of the output channels. For example, the controller may only be able to output waveforms which cause alternating blinking effects based on current supply limitations, for example.

The system may be used in various applications. In some embodiments, the system may be used in submersible environments to provide underwater lighting. Each of the devices, including the controller, connectors, transformer, and light strings may be constructed to be waterproof. In some embodiments, the system may be used in marine and/or aircraft vessels. In other embodiments, the system may be used as holiday lighting or landscape lighting. In some embodiments, the system including the controller, plug, socket, and connectors may be formed of a plastic material resistant to water penetration, UV effects, and other deteriorating causes.

In some embodiments, the controller may output electrical waveforms for being received by electrical devices other than lights or light strings. For example, the electrical waveforms may be transmitted to an audible device to cause the audible device to output a particular frequency. In other embodiments, the waveforms other than electrical waveforms may be generated and output by the controller. For example, a regulation of a fluid, such as water or gas, may be controlled by the controller and output to the independent channels in a particular frequency, timing, and/or volume.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A lighting system comprising:
   a first controller (930) comprising:
   a plurality of first function generators (855) each configured to generate a respective one of a plurality of first lighting command signals;
   a first dedicated power channel configured to receive operating power (920) and deliver pass-through operating power (985); and,
   a plurality of first data-over-power channels each operably coupled to a respective one of the plurality of first function generators and each configured to receive operating power and a respective one of the plurality of first lighting command signals; and,
   a second controller (960) coupled downstream from the first controller, the second controller comprising:
   a second plurality of function generators (855) each configured to generate a respective one of a plurality of second lighting command signals;

a second dedicated power channel configured to receive pass-through operating power from the first dedicated power channel; and, a second plurality of data-over-power channels each operably coupled to a respective one of the plurality of second function generators and each configured to receive operating power and a respective one of the plurality of second lighting command signals.

2. The lighting system of claim 1, further comprising:
a first light string (1530) coupled downstream from the first controller and upstream from the second controller, the first light string being operably coupled to an associated one of the plurality of first data-over-power channels to receive both operating power and one of the plurality of first lighting command signals.

3. The lighting system of claim 2, further comprising:
a second light string (1530) coupled downstream from the first controller and the second controller, the second light string being operably coupled to an associated one of the plurality of second data-over-power channels to receive both operating power and one of the plurality of second lighting command signals.

4. The lighting system of claim 3, wherein in operation, the first light string outputs a first lighting effect determined by the associated one of the plurality of first lighting command signals, and second light string outputs a second lighting effect determined by the associated one of the plurality of second lighting command signals.

5. The lighting system of claim 1, further comprising a means for electrically coupling the first controller with the second controller, the means for electrically coupling being pluggably coupled to at least one of the first controller and the second controller, and being configured to deliver pass-through operating power to the second dedicated power channel.

6. The lighting system of claim 1, wherein the first controller comprises a user interface configured to adjust at least one operating parameter of one of the plurality of first function generators.

7. The lighting system of claim 1, wherein the second controller comprises a user interface configured to adjust at least one operating parameter of one of the plurality of second function generators.

8. The lighting system of claim 1, further comprising a single-channel pluggable connector that operably couples the first controller with the second controller.

9. The lighting system of claim 8, wherein:
the single-channel pluggable connector comprises a first electrical contact, and,
the first electrical contact is operably coupled with the second dedicated power channel.

10. The lighting system of claim 1, further comprising a multi-channel pluggable connector that operably couples the first controller with the second controller.

11. The lighting system of claim 10, wherein:
the multi-channel pluggable connector comprises a plurality of electrical contacts comprising a dedicated power electrical contact, and,
one of the plurality of multi-channel electrical contacts is operably coupled with an associated one of the plurality of first data-over-power channels, another one of the plurality of multi-channel electrical contacts is operably coupled with an associated another one of the plurality of first data-over-power channels, and the dedicated power electrical contact is electrically coupled with the first dedicated power channel.

12. A lighting system comprising:
a first controller (930) comprising:
a first function generator (855) configured to generate a first lighting command signal;
a first dedicated power channel configured to receive operating power (920) and deliver pass-through operating power; and,
a first data-over-power channel operably coupled to the first function generator and configured to receive operating power and the first lighting command signal; and,
a second controller (960) coupled downstream from the first controller, the second controller comprising:
a second function generator (855) configured to generate a second lighting command signal;
a second dedicated power channel configured to receive pass-through operating power from the first dedicated power channel;
a second data-over-power channel operably coupled to the second function generator and configured to receive operating power and the second lighting command signal.

13. The lighting system of claim 12, further comprising:
a first light string (1530) coupled downstream from the first controller and upstream from the second controller, the first light string being operably coupled to receive the operating power and the first lighting command signal via the first data-over-power channel.

14. The lighting system of claim 13, further comprising:
a second light string (1530) coupled downstream from the first controller and the second controller, the second light string being operably coupled to receive the pass-through operating power and the second lighting command signal via the second data-over-power channel.

15. The lighting system of claim 14, wherein in operation, the first light string outputs a first lighting effect determined by the first lighting command signal, and second light string outputs a second lighting effect determined by the second lighting command signal.

16. The lighting system of claim 12, further comprising a means for electrically coupling the first controller with the second controller, the means for electrically coupling being pluggably coupled to at least one of the first controller and the second controller, and being configured to deliver the operating power.

17. The lighting system of claim 12, wherein the first controller comprises a user interface configured to adjust at least one operating parameter of the first function generator.

18. The lighting system of claim 12, wherein the second controller comprises a user interface configured to adjust at least one operating parameter of the second function generator.

19. The lighting system of claim 12, further comprising a single-channel pluggable connector that operably couples the first controller with the second controller.

20. The lighting system of claim 19, wherein:
the single-channel pluggable connector comprises a first electrical contact, and,
the first electrical contact is electrically coupled with the second dedicated power channel.

21. The lighting system of claim 12, further comprising a multi-channel pluggable connector that operably couples the first controller with the second controller.

22. The lighting system of claim 21, wherein:
the multi-channel pluggable connector is operably coupled to the first controller, the multi-channel pluggable connector comprises a plurality of electrical contacts comprising a dedicated power electrical contact, and, one of the plurality of electrical contacts is operably coupled with the first function generator, and the dedicated power electrical contact is electrically coupled with the first dedicated power channel.

23. A lighting system comprising:

a first controller (930) comprising:
- a plurality of first function generators (855) each configured to generate a respective one of a plurality of first lighting command signals;
- a first dedicated power channel configured to receive operating power (920) and deliver pass-through operating power (985); and,
- a plurality of first data-over-power channels each operably coupled to a respective one of the plurality of first function generators and each configured to receive operating power and a respective one of the plurality of first lighting command signals; and, a second controller (960) coupled downstream from the first controller, the second controller comprising:
- a second plurality of function generators (855) each configured to generate a respective one of a plurality of second lighting command signals;
- a second dedicated power channel configured to receive pass-through operating power from the first dedicated power channel; and,
- a second plurality of data-over-power channels each operably coupled to a respective one of the plurality of second function generators and each configured to receive operating power and a respective one of the plurality of second lighting command signal; and, a single-channel pluggable connector and a multi-channel pluggable connector that operably couple the first controller with the second controller;

wherein:
- the single-channel pluggable connector comprises a single-channel electrical contact,
- the multi-channel pluggable connector comprises a plurality of multi-channel electrical contacts comprising a dedicated power electrical contact,
- the single-channel electrical contact is electrically coupled with the second dedicated power channel, and,
- one of the plurality of multi-channel electrical contacts is operably coupled with an associated one of the plurality of first data-over-power channels, another one of the plurality of multi-channel electrical contacts is operably coupled with an associated another one of the plurality of first data-over-power channels, and the dedicated power electrical contact is electrically coupled with the first dedicated power channel.

24. The lighting system of claim 23, further comprising:
a first light string (1530) coupled downstream from the first controller and upstream from the second controller, the first light string being operably coupled to an associated one of the plurality of first data-over-power channels to receive both operating power and one of the plurality of first lighting command signals.

25. The lighting system of claim 24, further comprising:
a second light string (1530) coupled downstream from the first controller and the second controller, the second light string being operably coupled to an associated one of the plurality of second data-over-power channels to receive both operating power and one of the plurality of second lighting command signals.

26. The lighting system of claim 25, wherein in operation, the first light string outputs a first lighting effect determined by the associated one of the plurality of first lighting command signals, and second light string outputs a second lighting effect determined by the associated one of the plurality of second lighting command signals.

27. The lighting system of claim 23, wherein the first controller comprises a user interface configured to adjust at least one operating parameter of one of the plurality of first function generators.

28. The lighting system of claim 23, wherein the second controller comprises a user interface configured to adjust at least one operating parameter of one of the plurality of second function generators.

* * * * *